Nov. 24, 1942.   C. USCHMANN   2,302,725
PRECIPITATION PROCESS AND APPARATUS
Filed May 31, 1940   3 Sheets-Sheet 2

INVENTOR.
Curt Uschmann
BY Carlos G. Stratton
ATTY.

Nov. 24, 1942.  C. USCHMANN  2,302,725
PRECIPITATION PROCESS AND APPARATUS
Filed May 31, 1940  3 Sheets-Sheet 3
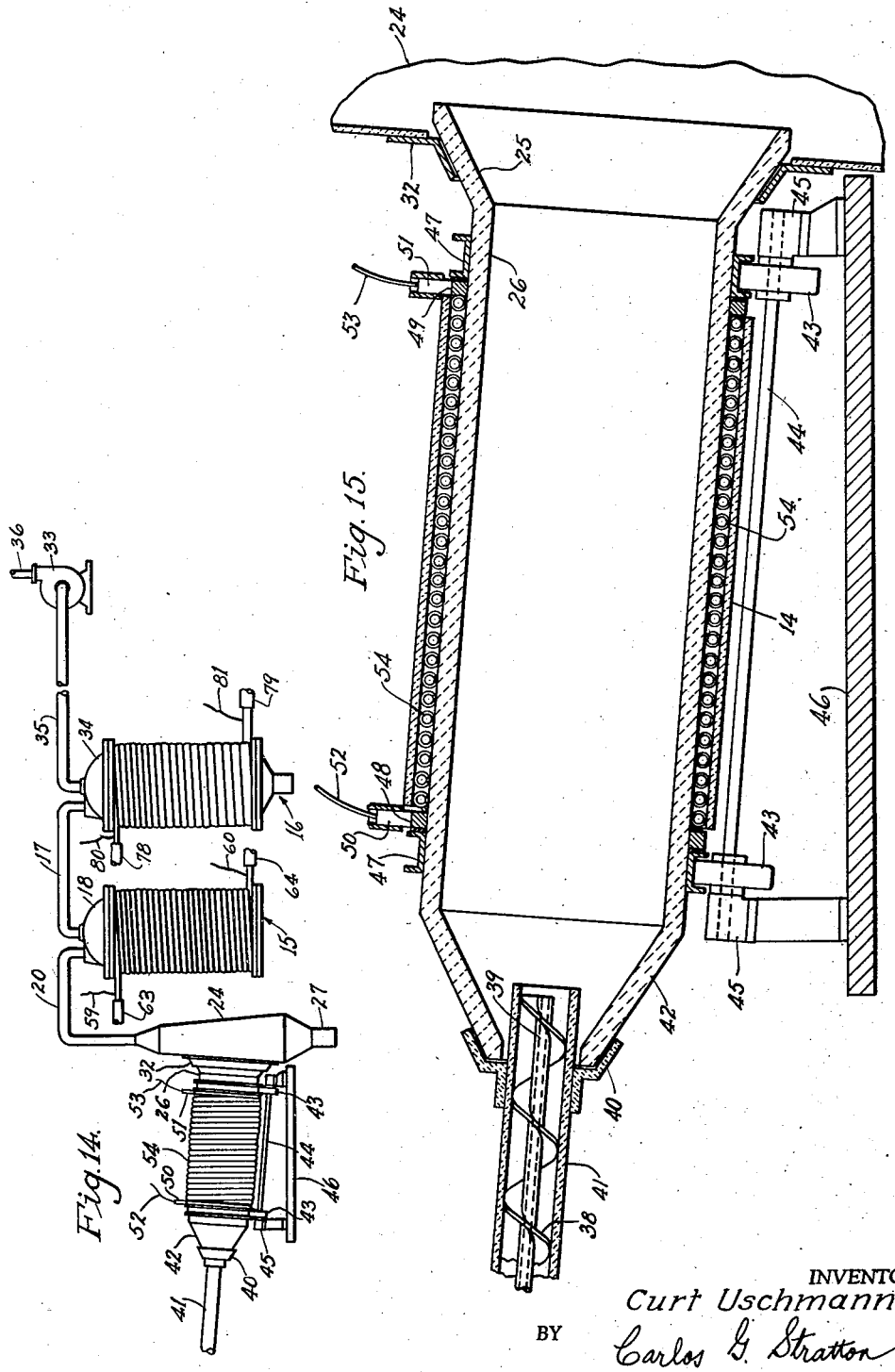
INVENTOR.
Curt Uschmann
BY Carlos G. Stratton
ATTY.

Patented Nov. 24, 1942

2,302,725

UNITED STATES PATENT OFFICE 2,302,725

PRECIPITATION PROCESS AND APPARATUS

Curt Uschmann, Huntington Park, Calif., assignor of one-half to John T. Maney, Los Angeles, Calif.

Application May 31, 1940, Serial No. 338,142

11 Claims. (Cl. 75—20)

My invention relates to a process and apparatus for precipitating selected metals, more particularly precious metals out of fumes, smelter gas, smoke, and the like, and an important object of the invention is to carry on such selective precipitation in the presence of high frequency current.

Another object of the invention is to carry on the precipitation by high frequency current, in the presence of a selected precipitant or substance that has or produces an affinity for selected fume molecules.

Still another object is to provide a plurality of precipitating units, each arranged with different precipitants or different substances that have or produce affinities for different, selected metallic molecules in the fumes, smelter gas, smoke, or the like.

A further object is to utilize nascent chlorine gas in the process and apparatus, in order to use as large a proportion as possible of the gas.

A still further object of the invention is to provide means in the apparatus to obtain an intimate contact between the gases, fumes or smoke and the precipitant.

The invention also comprises novel details of construction and novel combinations and arrangements of parts, which will more fully appear in the course of the following description. However, the drawings merely show and the following description merely describes an embodiment of the present invention, which is given by way of illustration or example only.

In the drawings, like reference characters designate similar parts in the several views.

Figure 14 is a diagrammatic view of the system.

Figure 15 is a longitudinal section through the first unit of the system.

Figure 1:
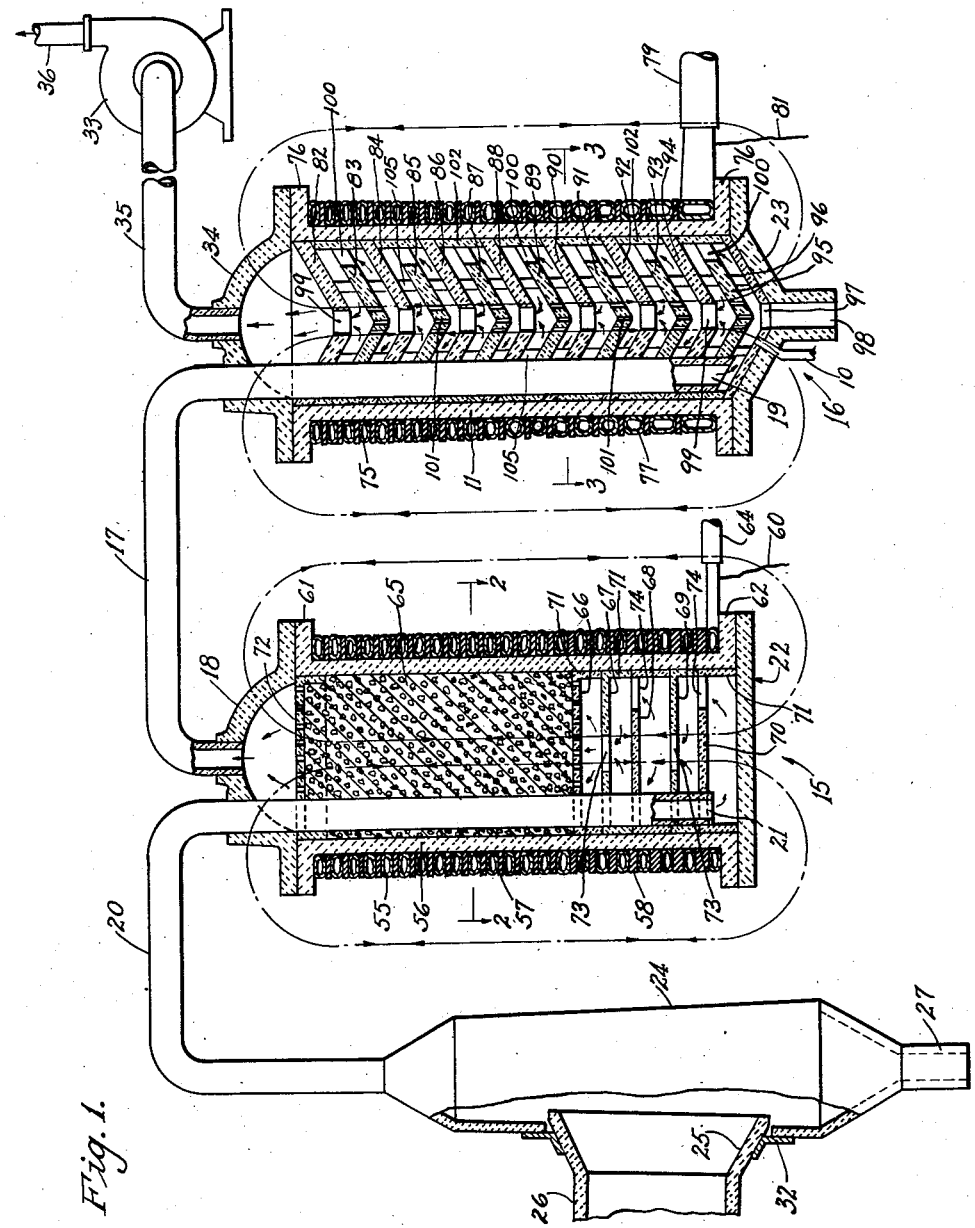
Figure 1 is a vertical section of an apparatus embodying the present invention.
Figure 2:
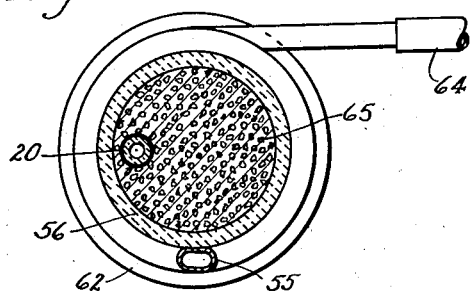
Figure 2 is a transverse section taken on the line 2—2 of Figure 1.
Figure 3:
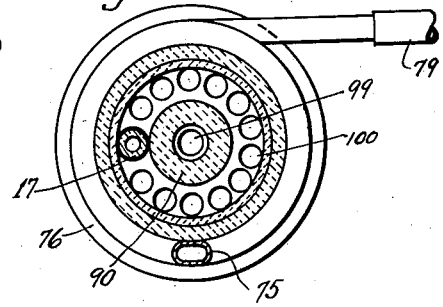
Figure 3 is a section taken on the line 3—3 of Figure 1.
Figure 4:
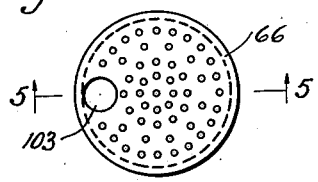
Figure 4 is a top view of an element comprised in the left-hand unit in Figure 1.
Figure 10:
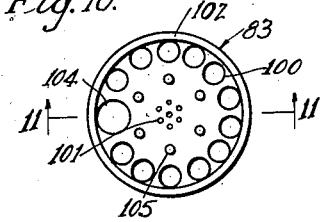
Figure 10 is a top view of an element comprised in the right-hand unit in Figure 1.
Figure 5:
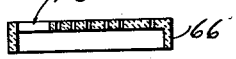
Figure 5 is a section taken on the line 5—5 of Figure 4.
Figure 6:
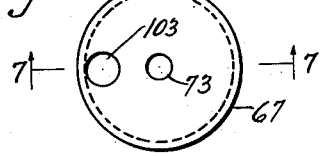
Figure 6 is a top view of another element comprised in the left-hand unit in Figure 1.
Figure 11:
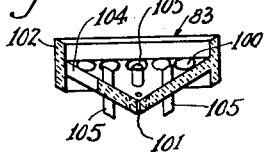
Figure 11 is a section taken on the line 11—11 of Figure 10.
Figure 7:
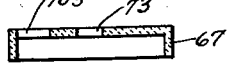
Figure 7 is a section taken on the line 7—7 of Figure 6.
Figure 8:
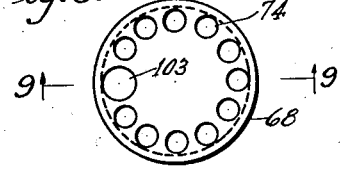
Figure 8 is a top view of still another element comprised in the left-hand unit in Figure 1.
Figure 12:
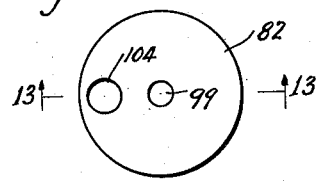
Figure 12 is a top view of another element comprised in the right-hand unit in Figure 1.
Figure 9:
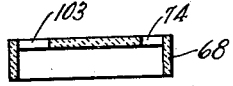
Figure 9 is a section taken on the line 9—9 of Figure 8.
Figure 13:
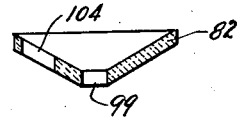
Figure 13 is a section taken on the line 13—13 of Figure 12.

Referring more in detail to the drawings, the reference numerals 15 and 16 generally designate the left- and right-hand units shown in Figure 1. The units are connected by means of a conduit 17 that connects with a dome-shaped top 18 on the unit 15 and with the unit 16 near the bottom 23 of the latter unit, in the interior thereof. The outlet of the conduit 17 in the unit 16 is shown at 19.

A chimney 20 conveys fumes, smelter gas, smoke, or the like, to the unit 15. The outlet of the chimney 20 in the unit 15 is shown at 21 and is disposed near the bottom 22 of the unit 15.

The fumes, smelter gas or smoke may be supplied to the chimney 20 by any suitable means, or from any suitable source. In the drawings is suggested a chamber 24 for collecting fumes, gas or smoke. For subject matter shown and described but not claimed herein, reference is hereby made to my co-pending application, Serial No. 324,302, filed by me on March 16, 1940. The chimney 20 may of course be connected with any suitable sources of precious metal bearing fumes and gases, to receive fumes and gases therefrom.

The discharge apron 25 of a rotary, roasting and volatilizing furnace 26 is shown in Figure 1 as arranged to discharge treated ore into the chamber 24. A down spout 27 at the bottom of the chamber 24 provides discharge for residue. Gases or fumes rising from the ore discharging from the apron 25 pass out through the chimney 20 into the first precipitating unit 15. A suitable valve (not shown) may be arranged in the down spout 27.

An annular guard 32 around the apron 25 substantially closes the space between the apron and the wall of the chamber 24.

The chamber 24 is preferably of refractory material, glazed tile or Transite, the latter being a well known material of commerce composed for the most part of asbestos, cement and magnesia.

A vacuum pump 33 is connected with the dome-shaped top 34 of the treating unit 16, by means of a conduit 35. The pump 33 discharges through the outlet pipe 36. The chimney 20 and conduits 17 and 35 are preferably of refractory material or Pyrex glass.

The furnace 26 as shown in Figure 15 has a screw type conveyor 38 mounted on a hollow shaft 39. Nascent chlorine or other gas may be injected into the furnace 26 through the hollow shaft 39. A ring 40 substantially seals the space between the housing 41 for the screw conveyor 38 and the tapered inlet 42 of the furnace 26. The conveyor 38, housing 41, ring 40, and the tapered inlet 42, as well as the remainder of the furnace body, are preferably of refractory material or Pyrex glass.

The furnace 26 is mounted on and driven by rollers 43 on a shaft 44. The rollers and shaft are driven by any suitable means (not shown). Bearings 45 support the shaft 44 on a foundation 46. Trunnion rings 47 around the furnace 26 are engaged by the rollers 43. Electric current conductive rings 48 and 49 are arranged on the circumference of the furnace 26, in insulated relation to the trunnion rings 47. Brush contacts 50 and 51 engage the rings 48 and 49 respectively. Suitable wiring 52 and 53 connect the said contacts in a suitable electric circuit.

A heating coil 54 is helically wound upon the furnace 26. The ends of the coil are connected with the conductive rings 48 and 49. Cylindrical insulation 14 is arranged about the coil.

The unit 15 as best seen in Figure 1 has a tubular current conductor 55 which is helically wound on the spool-like body 56 of the unit 15. Insulation 57 between the turns of the conductor 55 progressively increase in thickness, as shown at 58, toward the bottom 22 of the unit 15. The conductor 55 has suitable wiring 59 and 60, to connect the conductor 55 in a high frequency electric circuit. The conductor 55 is also connected with suitable water source and discharge in order to pass fluid through the conductor to cool same. Hollow, non-conductive connections 63 and 64 are fastened to opposite ends of the tubular conductor 55 as seen in Figure 14. The conductor 55 is wound on the body 56 of the unit between flanges 61 and 62.

A precipitating medium 65, arranged in granular or fragmentary pieces, is packed in the unit 15 upon a perforated partition 66. The composition of this medium will be hereinafter referred to. The partition 66 is superimposed upon a series of baffle plates 67, 68, 69 and 70. Flanges 71 maintain the perforated partition 66 and the plates 67 to 70 in spaced relation. The flange 71 of the bottom plate 70 rests upon the bottom 22 of the unit. A top perforated plate 72 rests upon the precipitating medium 65.

The plates 67 to 70 have staggered openings 73 and 74, so that gas, fumes, smoke, or the like enters the unit 15 at the bottom thereof, through the outlet 21, and passes upward in offset paths, as shown by the arrows pointing toward the openings 73 and 74. The gas then rises through the perforated partition 71, through the precipitating medium 65, through the partitions of top plate 72, and out through the pipe 17.

The plates 67 to 70, as well as the perforated partitions 66 and 72, are preferably made of material that will precipitate from the fumes, gas, or smoke the desired metallic element. In practice, the material is ground to granular and/or a pulverized state. The reduced material is then pressed or formed into the shape of the said plates and partitions. Suitable pressure and/or a binder such as silica or boron is used in forming the plates and partitions. Thus, not only the medium 65 but also the plates and partitions will have a precipitating or catalyzing effect upon the fumes, gas, or smoke passing through the unit. Precipitated material, in powder or other solid form, is collected in the unit 15 or in other words a definite affinity for the fume molecules.

Only a certain metal or metals are precipitated from the fumes, gas or smoke, in the unit 15, depending upon the material used to precipitate or catalyze same. The smoke, gas or fumes, containing other non-precipitated materials, is drawn from the unit 15 through the conduit 17, by means of the suction pump 33, and into the unit 16.

A tubular conductor 75 is helically wound upon the spool-like body 11 of the unit 16 between flanges 76 thereon. As the tubular conductor 75 nears the bottom 23, it is widened, as shown at 77, to provide temperature control and/or greater internal cooling area and to make the winding less compact at the lower end of the unit 16. Non-conductive connections 78 and 79 connect the conductor 75 with a suitable source and discharge for cooling liquid. Wires 80 and 81 connect the conductor 75 in a high frequency circuit.

Arranged within the unit 16 is a superimposed series of dished plates 82 to 96 inclusive. The plate 96 is a dished plate conforming to the concave inner surface of the bottom 23. A center opening 97 is alined with outlet 98 of the unit 16.

Alternate plates 82, 84, 86, 88, 90, 92 and 94 have central outlets 99 in the lower portion of such dished plates. Alternate plates 83, 85, 87, 89, 91, 93 and 95 have annular series of openings 100 around their respective peripheries. Thus, the openings 99 and 100 are disposed in staggered arrangement so that the gas, fumes, or smoke introduced into the unit 16 at the bottom thereof follows a zigzag path upward through the unit 16, drawn by the suction provided by the fan 33.

The plates 83, 85, 87, 89, 91, 93 and 95 also have restricted center orifices 101, and peripheral rings 102 that space apart the plates 82 to 96. Thus, liquid that is precipitated or catalyzed from the fumes, smoke or gas will descend in the unit 16 through the openings 99, the orifices 101, and the opening 97 and be collected at the outlet 98.

Openings 103 are arranged in the plates and partitions in unit 15 for receiving the pipe 20, while openings 104 are provided in the plates in unit 16 for receiving the pipe 17. Pegs 105 are arranged on the upper and lower surfaces of the plates 83, 85, 87, 89, 91, 93 and 95. These pegs aid in spacing the dished members and in supporting one upon the other.

A conduit 18 may be utilized to introduce hydrogen into the gases or fumes entering the unit 16 through the pipe 19.

In the operation of the device, feed material is introduced into the furnace or roasting chamber 26 by means of the screw conveyor 38, while nascent chlorine or other gas is introduced therein by means of the hollow shaft 39. Nascent chlorine gas tends to cause all of the precious metals to become volatilized into a complex fume and is highly selective of such metals at temperatures not exceeding 1000° centigrade. At 750° centigrade it will volatilize the precious metals including gold and platinum groups, while at these temperatures no iron oxides will volatilize. The gold may be recovered in the unit 15 while the platinum groups may be recovered in the unit 16. If any tin is in the fume it must be recovered, if this be desirable, in a third unit. If, on the other hand, lead or zinc is present in the ore, these should be eliminated before the ore is fed into the furnace 26.

During operation, the furnace or roasting chamber 26 is rotated, and due to the inclination of this furnace or roasting chamber, material progresses downwardly therein and is discharged therefrom across the apron 25. The heating coil 54 heats the material in the furnace or roasting chamber 26 during the rotation thereof, through the intermediary of the conductive rings 48 and 49, and the contacts 50 and 51.

The feed material is precious metal-bearing ore. The heating thereof in the furnace or roasting chamber 26 in the presence of nascent chlorine gas volatilizes precious metals in the ore, which metals, upon heating of the ore, are converted into a fume. The fumes are collected in the chamber 24, from which they are drawn into the pipe 20, by means of the suction fan 33. Solid residue drops down and is discharged at 27. The suction fan also functions to draw fumes from within the furnace or roasting chamber 26.

From the gases and fumes thus collected, desired metals are selectively and separately precipitated in the plurality of treating units. It is to be understood that as many treating units may be used as are desired, to separately precipitate various metals.

The materials used to effect precipitation in the several treating units will of course depend upon the metals desired to be precipitated. By way of examples only, and not by way of limitation, if it is desired to precipitate gold from the fumes, the medium 65 would be calcium chloride held together by a suitable binder. Moreover, the baffle plates 67 to 70 are preferably of crushed calcium chloride that has been pressed or molded with the binder into flat or dished discs. (Certain precipitating media may be burned or calcined in preparing the discs of same.) Staggered, regularly spaced openings are shown in the discs, but it is believed clear, without detailed illustration, that the precipitating medium may be formed in a sponge-like arrangement, to provide irregular passages therethrough.

Passing of the fumes through a selected precipitating medium causes intimate association and contact of the fumes and gases with the precipitating medium. Due to selecting such medium, the desired metal is precipitated in each unit.

This precipitation is effected in the presence of high frequency current (e. g., 30,000 cycles, although it may range from 2000 cycles to 240,000 cycles), and in the presence of low voltage current (e. g., up to 440 volts).

This high frequency, low voltage current is controlled to properly activate the materials employed in the units 15 and 16 and to bring the fumes or gases to the desired temperature to gain the optimum precipitation of the desired metal. No other source of heat is necessary. Of course, the frequency (and voltage) may be varied in the plurality of heating units, depending upon the metals desired to be precipitated.

Any or all of the body portions or shells of the two precipitating units may be of carbon or be carbon lined. This is especially desirable when the ore being treated is non-conductive or is lean in conductive material. Any or all of the body portions may be of refractory or other non-conductive material, if the material is magnetic, magnetizable, or electro-conductive.

The treating unit 16 may be used to bring the gases or fumes into intimate contact with a hydrogenating medium (through the conduit 10) in the presence of carbon that is activated under the influence of high frequency current. At the same time, the gases or fumes are brought into close contact with a precipitating and/or catalyzing medium. In this way the desired gaseous element in the fumes is liquefied since certain of the fume molecules have an affinity for hydrogen and combine with the activated carbon to form hydro-carbons. The temperature, high frequency electrification, chlorination, vibration by rapid molecular reversion, hydrogenating and carbonizing control liquefaction.

By reason of the dished discs in the unit 16, liquid gathered by the discs and in the spaces between the discs drains down through the center openings 99 and through the orifices 101. The tapered bottom member 96 collects liquid and directs it to the drain 98.

By way of further examples and not by way of limitation, if platinum were desired, the precipitating medium would be olivine, serpentine, or derivatives therefrom. The precipitating medium or media chosen are those that have an affinity (or obtain an affinity by reason of the high frequency current, temperature, chlorination, hydrogenation, and/or carbonization) for the metal desired to be precipitated.

The fumes or gases, bearing the unprecipitated metals, pass from the one unit to the next. Thus, only the metal desired is precipitated in any given treating unit.

The spacing of the turns of the coil 55 successively farther apart as they approach the bottom of the unit 15, and the successive widening of the individual turns as they approach the bottom of the unit 16 provide less density in the lines of electrical force, toward the bottoms of the units, for the treatment of certain fumes. The high frequency lines of force follow generally the broken lines shown in ovel patterns in and around units 15 and 16, in Figure 1. The arrowheads on said broken lines indicate the alternating nature of the high frequency current, whereby intense vibration is set up in the molecules of the fumes or gases from which metals are being precipitated.

It is to be understood that the partial vacuum produced by the mechanism 33 controls the temperature at which fumes are treated in the system. A greater vacuum produced by faster operation of the pump 33 will produce a more rapid flow through the system, and hence a lower temperature; and a lesser vacuum produced by slower operation of the pump 33 will produce a slower flow through the system and hence permit a higher temperature therein. Controlling the temperature affords means for aiding in the recovery of the desired metallic elements or molecules.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. The process of precipitating gold from gold-bearing fumes in which the gold is in gaseous state, comprising subjecting the fumes to the presence of calcium chloride, under the influence of relatively high frequency current.

2. A unit for selectively recovering material, comprising a carbon cylinder, a hollow, conductive coil wound upon the cylinder, means connecting the coil in a high frequency circuit, means connecting with the coil to supply cooling water thereto, baffles of material adapted to precipitate the material to be recovered, arranged in the cylinder to provide a zig-zag path therein, means to supply to the unit fumes bearing the material to be recovered, and means to effect a circulation of the fumes past the baffles.

3. A unit for selectively recovering material from fumes, comprising a housing, a hollow, conductive coil wound upon the housing, means connecting the coil in a high frequency circuit, means connecting with the coil to supply cooling water thereto, pervious partitions of material adapted to precipitate the material to be recovered, arranged in the housing, to provide an intimate contact between the fumes and the partitions, and means to supply to the unit fumes bearing the material to be recovered.

4. A unit for selectively recovering material from fumes, comprising a housing, means to apply high frequency current to material within the housing, pervious partitions of material adapted to precipitate the material to be recovered, arranged in the housing, to provide an intimate contact between the fumes and the partitions, and means to supply to the unit fumes bearing the material to be recovered.

5. Apparatus for selectively recovering material from fumes, comprising a housing having an inlet end and a discharge end, conductive means wound upon the housing and connected to apply high frequency current to material within the housing, the number of turns of the conductive means being fewer for a given distance at the inlet end than toward the discharge end, to increase the density of the high frequency lines of force toward the discharge end, and means arranged in the apparatus to provide an irregular path between the ends of the apparatus, the latter means tending to precipitate selected solid particles in the fumes.

6. Apparatus for selectively recovering material from fumes, comprising a conductive housing, conductive means wound upon the housing and connected to apply high frequency current to material within the housing, and means arranged in the apparatus to provide an irregular path between the ends of the apparatus, the latter means tending to precipitate selected solid particles in the fumes.

7. Apparatus for selectively recovering material from fumes, comprising a housing, conductive means wound upon the housing and connected to apply high frequency current to material within the housing, means to supply a treating gas to the fumes, and means arranged in the apparatus to provide an irregular path between the ends of the apparatus, the latter means tending to precipitate selected solid particles in the fumes.

8. Apparatus for selectively recovering material from fumes, comprising a housing, conductive means wound upon the housing and connected to apply high frequency current to material within the housing, and partitions in the apparatus comprised of material tending to precipitate selected solid particles in the fumes, the partitions having staggered openings, to provide a zig-zag path for the fumes through the apparatus past the partitions.

9. Apparatus for selectively recovering material from fumes, comprising a housing, means to apply high frequency current to the material within the housing, means to supply gas to the fumes tending to liquefy selected solid particles in the fumes, and dished partitions in the apparatus arranged to catch precipitated liquid, the partitions having staggered openings, to provide a zig-zag path for the fumes through the apparatus, the lowermost portions of the dished partitions connecting for successively draining the liquid through the apparatus.

10. Apparatus for selectively recovering material from fumes, comprising a housing, means to apply high frequency current to the material within the housing, partitions in the apparatus comprised of material tending to precipitate selected solid particles in the fumes, the partitions providing an irregular path in the apparatus for the fumes, and means mounted on the partitions to space same from each other and to support each other.

11. Apparatus for selectively recovering material from fumes, comprising a conductive housing, a hollow, conductive coil wound upon the cylinder, means connecting the coil in a high frequency and low voltage circuit, means connecting with the coil to supply cooling water thereto, means arranged in the apparatus to provide an irregular path, the latter means tending to precipitate selected solid particles in the fumes, means to supply fumes to the apparatus at the lower part of the precipitating means and means to effect circulation upward in said irregular path, to effect said precipitation.

CURT USCHMANN.